United States Patent [19]

Rumbaugh

[11] Patent Number: 4,821,210

[45] Date of Patent: Apr. 11, 1989

[54] FAST DISPLAY OF THREE-DIMENSIONAL IMAGES

[75] Inventor: James E. Rumbaugh, Schenectady, N.Y.

[73] Assignee: General Electric Co., Schenectady, N.Y.

[21] Appl. No.: 33,309

[22] Filed: Apr. 2, 1987

[51] Int. Cl.$^4$ ................................................. G06F 3/14
[52] U.S. Cl. .................................... 364/518; 364/522; 340/729
[58] Field of Search ...................... 364/522, 518, 521, ; 340/729, 734

[56] References Cited

U.S. PATENT DOCUMENTS

| | | | |
|---|---|---|---|
| 4,674,046 | 6/1987 | Ozeki et al. | 364/414 |
| 4,684,990 | 8/1987 | Oxley | 358/183 |
| 4,685,070 | 8/1987 | Flinchbaugh | 364/522 |
| 4,710,876 | 12/1987 | Cline et al. | 364/414 |
| 4,719,585 | 1/1988 | Cline et al. | 364/518 |

OTHER PUBLICATIONS

Goldwasser et al., "Real time Display and Manupulation of 3-D Medical Objects: The voxel Processor Architecture", CVGIP 39, 1-27, (1987).
Potmesil M., "Generating Octree Models of 3D Objects from their Silhouettes in a Sequence of Images", CVGIP 40, 1-29, (1987).
"Fundamentals of Interactive Computer Graphics", by Foley et al., Addison-Wesley Publishing Co., 1982, Ch. 8, 13, 14, 15.
"Back-to-Front Display of Voxel-Based Objects", by Frieder et al., University of Pennsylvania, Sept. 1985.
"Volume Rendering Algorithms for the Presentation of 3-D Medical Data", by Talton et al., Proc. of NCGA, vol. 3, 1987, pp. 119-128.

Primary Examiner—Gary V. Harkcom
Assistant Examiner—Phu K. Nguyen
Attorney, Agent, or Firm—Paul R. Webb, II; James C. Davis, Jr.

[57] ABSTRACT

A system and method for scanning a plurality of volumetric cells containing three dimensional image information onto a two-dimensional viewplane comprising the steps of: organizing the cells to conjointly represent a volume by arranging them contiguous to each other and forming a plurality of parallel, planar arrays; sequentially displaying the cells by planar arrays starting with the array most distant from the viewplane and proceeding to the array closest to the viewpoint; within each displayed array, displaying the cells by rows starting with the row most distant from the viewplane and proceeding to the row closest to the viewplane; and, within each row, displaying the cells in order of decreasing distance form the viewplane; and for each cell, displaying the polygonal surfaces within the cell.

6 Claims, 6 Drawing Sheets

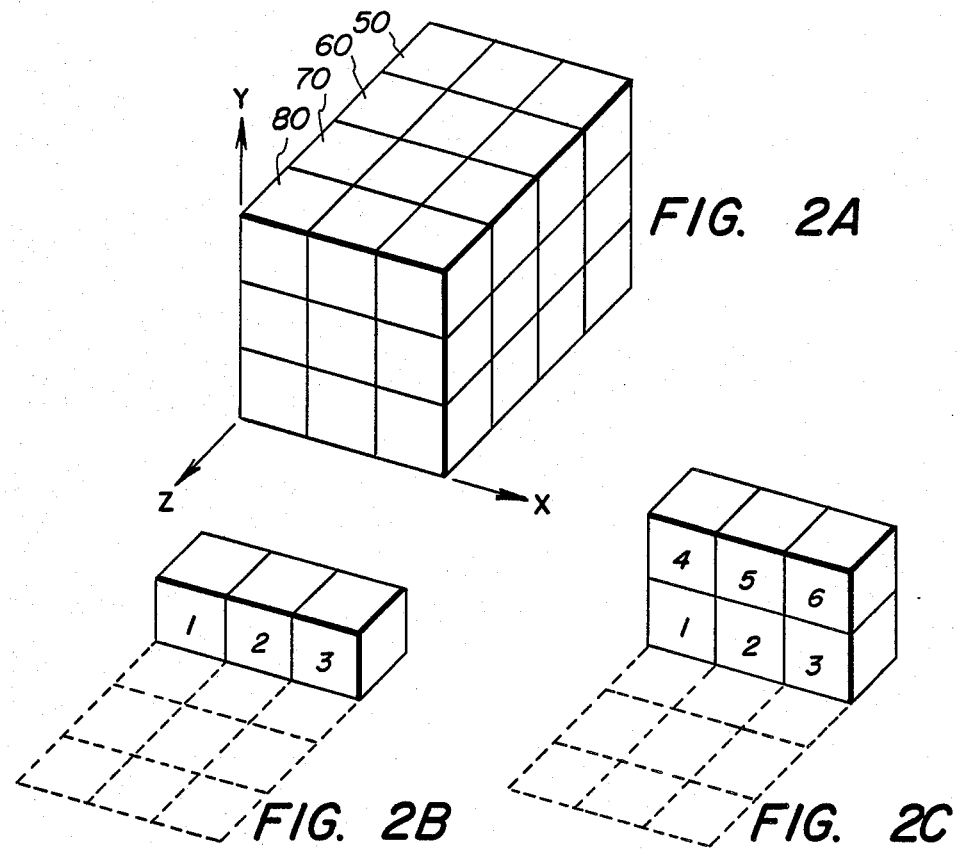
FIG. 2A
FIG. 2B
FIG. 2C
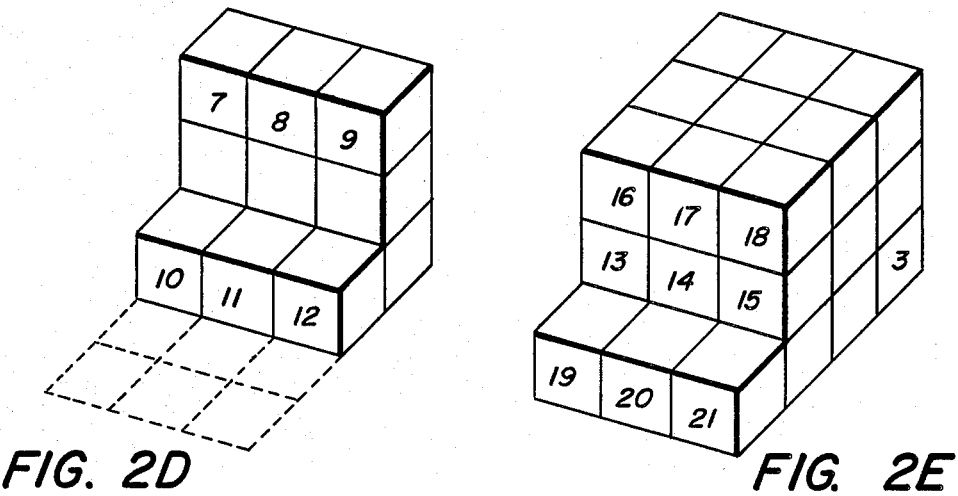
FIG. 2D
FIG. 2E

FAST DISPLAY OF THREE-DIMENSIONAL IMAGES

BACKGROUND OF THE INVENTION

The present invention is generally directed to a system and method for displaying surface information. More particularly, the present invention is directed to a system and method for displaying internal surfaces existing at various depths and locations within a three dimensional body. The images of the surfaces displayed are typically contained within the interior regions of solid bodies which are examined by computed axial tomographic (CAT) x-ray systems or by nuclear magnetic resonance (NMR) imaging systems either of which is capable of generating three-dimensional arrays of data representative of one or more physical properties at various locations within a three-dimensional object. The images generated in the practice of the present invention are particularly useful in that they provide three-dimensional data for examination by physicians, radiologists and other medical practitioners.

In conventional x-ray systems, a two dimensional shadow image is created based upon the different x-ray absorption characteristics of bone and soft tissues. A great improvement on the conventional x-ray system as a diagnostic tool is provided by computed axial tomographic systems, which have been developed over the last ten years or so. These so-called CAT systems are x-ray based and initially were used to produce single two-dimensional views depicting transverse slices of a body, object or patient. Three dimensional information was thereafter gleaned from CAT scan data by generating data for a number of contiguous slices and using the inferential abilities of a radiologist to suggest a three-dimensional representation for the various internal organs. In the present invention, three-dimensional images are generated from the three-dimensional array of data generated by a sequence of such contiguous CAT scans or magnetic resonance imaging scans. The newer magnetic resonance imaging technology possesses the capability to better discriminate between various tissue types, not just between bone and soft tissue and therefore offers the capability for producing more discriminating images in many situations. NMR imaging systems are also capable of generating physiological data rather than just image data. However, whether NMR or CAT systems are employed, data has generally been available only as a sequence of slices, and systems have not generally been available which provide shaded two-dimensional images which accurately depict true three-dimensional views.

A system referred to as "marching cubes" and disclosed in U.S. Pat. No. 4,710,876 has significantly solved some of the major problems associated with the production of high resolution three dimensional medical images. An additional application relating to the display of three-dimensional images and a system referred to as "dividing cubes" was disclosed in U.S. Pat. No. 4,719,535. The contents of these two applications are hereby incorporated herein by reference. Both of these applications are assigned to the same assignee as the present invention. The present invention is in fact applicable to processing an image either in accordance with the marching cubes system or the dividing cubes system or in accordance with other similar systems.

The present invention relates specifically to systems and methods for displaying three dimensional images of various origins. The images may be generated via medical diagnostic techniques, such as computed axial tomography, magnetic resonance, ultrasound, etc. as specifically described in the above noted application. Alternatively, the images may result from solid modeling techniques generated by mechanical design systems, from available topographic information or from various, almost unlimited sources. In all such instances it is desirable to construct a 3-D image and provide a user with the capability of viewing it from different positions and distances and changing such positions interactively as desired. In all such techniques, the data processing required to change the 3-D image to correspond to a selected viewpoint must be done at relatively high speed in order to operate in an interactive mode. Producing a realistic picture of a three-dimensional object on a two-dimensional display presents many problems. How is depth, the third dimension, to be displayed on the screen or display surface? How are parts of objects to be identified and removed from the picture? How are these objects to be rotated, translated, and scaled? There are a number of well known techniques which have been developed to address these questions and which are well known in the art. Several well known techniques for the various aspects of displaying three-dimensional views objects are discussed in "Fundamentals of Interactive Computer Graphics" by J. D. Foley and A. Van Dam.

One particular problem which must be dealt with in order to properly present a new 3-D display in response to changing viewpoint is that of hidden surface elimination or removal. There are several known systems which fit flat polygons to a 3-D surface to within acceptable tolerances and then perform hidden surface removal on the set of polygons. These methods typically employ one of two methods, both of which impair performance.

In a first method, the polygons are sorted by distance from the observer, and drawn on the view surface from back to front. A closer object will overwrite a farther object, thereby obscuring it. This method has the disadvantage that the polygons must be resorted for each new view, which is time-consuming for large images. Furthermore, because the sort operation is sequential, this method cannot easily be implemented using parallel hardware for greater speed.

In a second method the polygons may be drawn on the view surface in any order, but each pixel on the view surface is associated with a depth register or buffer indicating the distance of the surface in the pixel from the viewpoint. As each polygon is drawn, the distance of the polygon at each pixel position is compared to the current value in the pixel distance register; the new information replaces the previous information only if the new distance is less than the previous distance. This technique has the disadvantage that the resolution of the distance register must often be much greater than the resolution of the intensity data for the pixel itself to ensure correct ordering among polygons; 8 bits is generally enough for intensity, while 16–32 bits may be needed for distance. The distance of a polygon from the viewpoint is different at each pixel location in the image, so it must be computed as part of the drawing step. In addition, each distance value must be compared against the previous value before the pixel is updated, which requires an additional pixel memory reference and a comparison operation. The process is exactly equivalent to searching through all the depth or z values that a point (X,Y) can have, assuming that a number of polygons overlap on (X,Y) and assigning to the pixel the appropriate value from the polygon that has the smallest z value. This method is suitable for parallel hardware implementation, but complicated hardware is required for the distance computations, storage and comparisons.

In the above noted patents is disclosed a technique, referred to herein generally as "triangulation", which is used for converting a 3-D grid of density information (an array of volumetric cells or "voxels") into a set of flat polygons (triangles) which approximate the surface contour of a given density value. In implementing the triangulation technique disclosed in the aforementioned applications the surfaces are viewed with commercially available VLSI geometry engines, such as those produced by Weitek, Silicon Graphics, Lexidata, and Ramtek. However, these geometry engines suffer the disadvantages described above with respect to hidden surface removal.

This invention is particularly directed to a method for constructing a geometry engine for the display of triangulated polygons produced by the method disclosed in the aforementioned copending applications which avoids the disadvantages described above. Use of the triangulation method of the copending applications to generate approximating polygons together with the method disclosed herein to display the polygons makes possible implementation of an extremely fast display processor with no bottlenecks.

OBJECTS AND SUMMARY OF THE INVENTION

Accordingly, it is seen that it is an object of the present invention to provide a system and method for the display of three-dimensional information.

It is a further object of the present invention to provide a display system for use in conjunction with CAT scanners, ultrasound devices, NMR imaging systems and any and all other systems capable of generating three-dimensional data representative of one or more physical properties within a body to be studied.

It is yet another object of the present invention to provide a graphical system for medical image display which is capable of interactive use and yet at the same time produces high quality images.

It is also an object of the present invention to provide a system and method which is readily fabricatable in conventional electronic hardware, especially that used in CAD/CAM systems.

It is a further object of the invention to provide a system for displaying three dimensional images which specifies a predetermined, defined order of scan of individual cells making up an image to remove hidden surfaces.

A yet further object is to provide a 3-D display technique which does not require sorting and resorting of image information in order to accomplish hidden surface removal in the displayed 3-D image.

A still further object of the invention is the provision of a 3-D display system which relies on a regular and repetitive scan order to reduce the computation time needed for hidden surface removal.

Lastly, it is an object of the present invention to provide a system and method for the display of three dimensional images of internal surface structures in such a way that the specific viewing angle may be selected by the user in an interactive manner and a resulting scan order for the display volumes be readily determined by a simple distance value between the viewpoint and the display volumes.

In accordance with a preferred embodiment of the present invention, a system for displaying three dimensional surface structures comprises means for generating and storing three dimensional signal patterns which represent the value of at least one physical property which is associated with a three dimensional body at rectangularly spaced grid locations within a body. The system includes means for retrieving volumetrically adjacent signal pattern values, these values being located at adjacent grid locations which serve to define a volumetric test cell. As used herein, the term "volumetrically adjacent" refers to grid locations which exist at adjacent vertices which define the selected volumetric test cell used in the surface approximation scheme herein disclosed as will be illustrated in greater detail hereinafter. The particular volumetric test cell illustrated herein is a cube and for this reason, "volumetrically adjacent" refers to grid locations which exist at the eight corners or vertices forming a given cube or parallelepiped. The system also includes means for comparing each of these eight cubically adjacent values with a predetermined threshold value or range of values so as to generate an eight bit binary vector which is used herein as an addressing or generating code. The system also includes means for generating a set of coordinate values for each of the distinct binary vectors generated. Each of these sets defines zero, one or a plurality of polygonals which are located completely within the associated volumetric cell being displayed. These coordinate values represent the vertices of zero or more predetermined polygonal surface which approximate the intersection of surface determined by a threshold value with the volume defined by the eight grid locations. In general, these coordinate values are also selected to be dependent upon the location of the eight grid points within the body. A preferred embodiment of the present invention further includes display processor means for receiving the coordinate values and for converting these coordinate values to a particular display format. The preferred embodiment also includes means for displaying only those surfaces determined by the predetermined threshold, the display means being driven by the display processor.

In order to display the three dimensional image generated in the above described manner, the image information within these volumetric test cells or voxels is displayed in a regular, defined manner which inherently removes hidden surfaces by the order in which the cells are scanned and displayed. The principle behind the order of display is based on the rule that if a first cell contains no portion of the image which is obscured by a second cell, then no polygonal representative surface within the first cell can be obscured by any surface within the second cell. It will be demonstrated that a simple ordering is possible for sequentially scanning the test cells so that each new cell to be displayed is completely unobscured by any previously displayed cell. If the cells are scanned in this order and the approximating polygonal surfaces within each cell are projected and drawn onto the display screen in this order, no polygonal surface will be obscured by any previously-drawn polygonal surface (except possibly a triangle within the same cell which can be ignored without unacceptable image deterioration). A value written into a pixel simply overwrites a previous value with no necessity for the use of distance registers or comparisons as employed in the above noted prior art approaches.

The overall method for such a display, in accordance with the invention, may be stated in shorthand or psuedo code form as follows:

For each volume to be displayed, scan by planar arrays of test cells in order of decreasing distance from the viewplane of the planar arrays;

For each such planar array, scan by rows of test cells in order of decreasing distance of the rows from the viewplane;

For each row of test cells, scan by individual test cells in order of decreasing distance of the cells from the viewplane; and For each test cell, paint all the representative polygons contained therein on the display surface.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIGS. 2A-2E illustrate the order in which display volumes in an image similar to that shown in FIGS. 1A-1C are scanned according to the invention;

DETAILED DESCRIPTION OF THE INVENTION

As indicated above, the instant invention is an improvement to the method and apparatus disclosed in aforementioned U.S. Pat. Nos. 4,710,876 and 4,719,535. Therefore, a complete understanding of the present invention can best be had by understanding the method of surface approximation disclosed in these applications. For this reason a brief review of that method will be given.

Figure 1A:
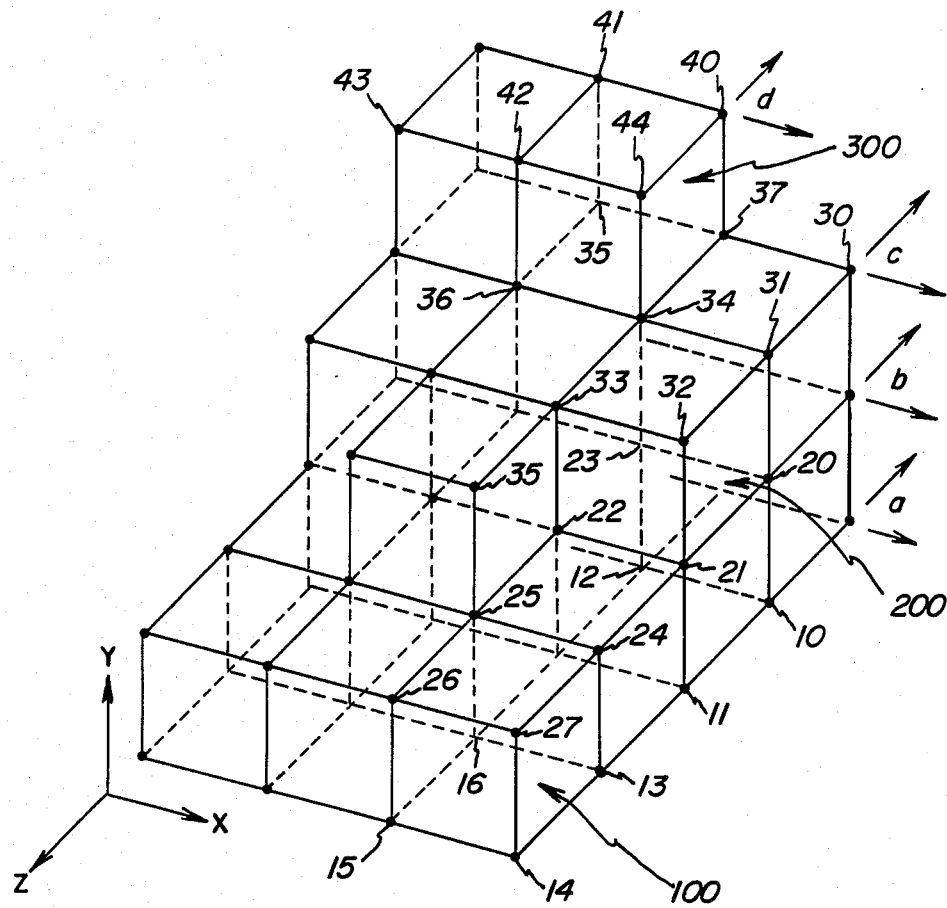
FIG. 1A is an isometric view illustrating patterns of data value points lying at the vertices of the volumetric test cells which are examined to form an image.

Referring to FIG. 1A the system and method for displaying three dimensional images according to the aforementioned applications takes as its input a series of analog signal values which represent some physical characteristic of the three dimensional body or object to be imaged. As is done conventionally, these signal values may be developed by the use of medical diagnostic equipment and, for example, may be the X-ray absorption values at various grid-like locations within the object to be displayed. These values are stored in a suitable memory device of a computer as a series of arrays corresponding to the various slices taken through the body or object to be displayed.

Thus, referring to FIG. 1A, a first series of analog values 10-16 are located in a first plane "a". If mutually perpendicular coordinates X, Y, Z are selected as references, the pattern of analog values in the plane "a" is seen to coincide with the XZ plane using the reference system shown and are spaced from each other and located at regularly spaced points on a grid like system. The various values 10-16 represent analog values of a preselected physical characteristic in the plane of the body or object to be displayed. In a similar manner, plane "b" is represented by a series of analog values 20-27, also parallel to but spaced from the arbitrarily selected X,Z plane. Similarly, plane "c" consists of grid-related values 30-37, and plane "d" consists of values 40-44 also as shown in FIG. 1A. It is, of course, understood that analog values occur at all the corresponding grid locations in each designated plane, but only some have been specifically numbered and shown in FIG. 1A for purposes of explanation.

It should also be noted that by appropriately grouping discrete analog values for adjacent planes "a"-"d", FIG. 1A may be viewed as forming a plurality of volumetric test cells formed conjointly by a plurality of analog values at volumetrically adjacent grid locations. For example, values 13-16 from plane "a" and 24-27 from plane "b" jointly form a cubic volumetric cell 100 and these may be referred to as cubically adjacent, as previously defined. Similarly, volumetric cell 200 is formed jointly by values 20-23 from plane "b" and 31-34 from plane "c". Likewise, cubic volume 300 is formed conjointly by analog values 34-37 from plane "c" and 40, 41, 42-44 from plane "d".

The entire image, therefore may be thought of as being defined cumulatively by all of the test cells thus formed. As can be seen the test cells themselves may be viewed as forming a plurality of planar arrays, each array extending parallel to one of the arbitrarily created pairs of X, Y, Z axes.

The cubically adjacent values, in addition to jointly forming volumetric cells, also provide information regarding the object to be displayed. For example, if all of the values at the vertices of a given volumetric cell are zero, no surface of the object is within that cell. Similarly, if all the values are greater than zero, most of the volume of the cubic test cell will contain a portion of the object to be displayed. Between these two extremes lie various combinations of vertex values which in combination represent various impingements of the object to be displayed into the cubic test cell. In order to represent in an approximate way this scalar gradation of impingement patterns, there are disclosed in the aforementioned applications a set of 14 distinct polygons or combination of polygons which may be used to approximate the object within a specific test cell. The particular polygonal pattern selected to represent the surface is selected as provided in the aforementioned applications based on the analog values at the vertices defining the particular test cell.

Figure 1B:
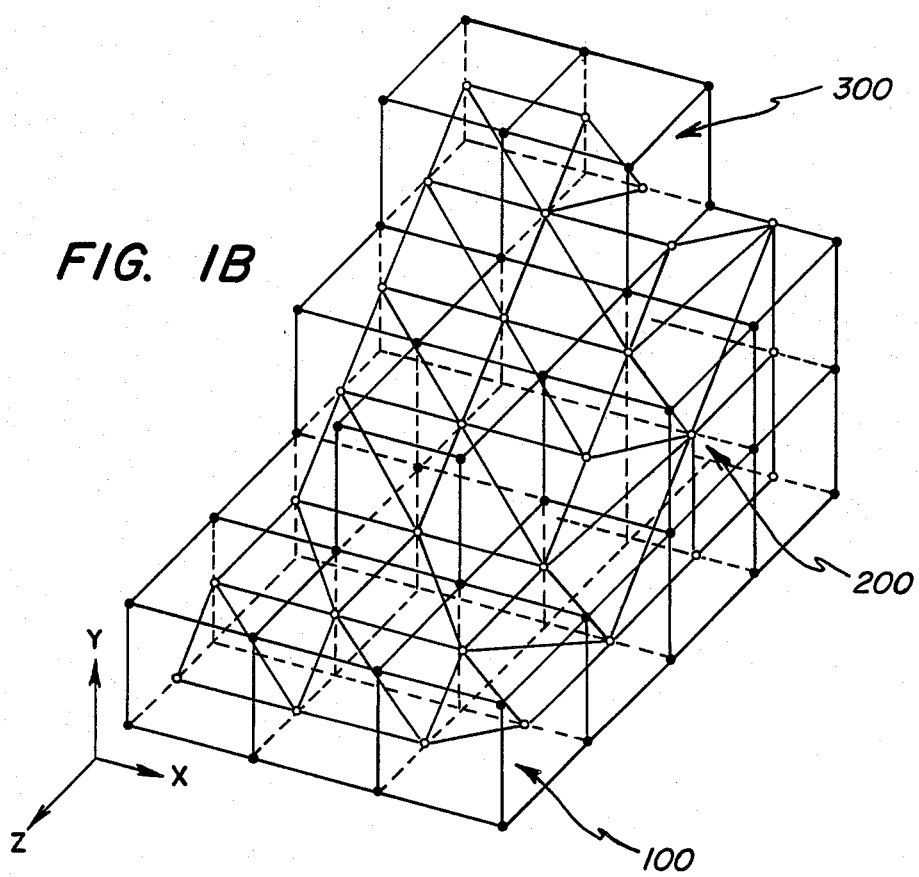
FIG. 1B is an isometric similar to that shown in FIG. 1A in which the representative polygonal (triangular) surfaces formed to approximate the intersection of the object to be displayed and the various test cells are shown.
Figure 1C:
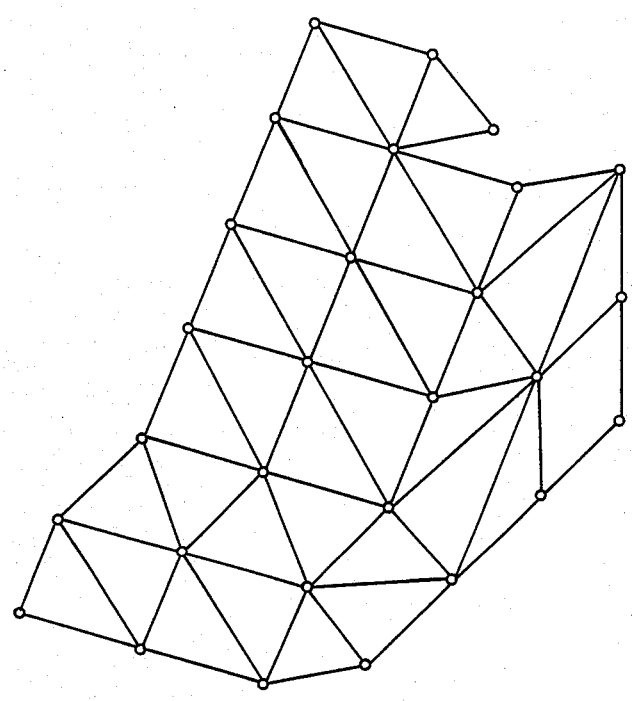
FIG. 1C is an isometric view of the three dimensional representation of the object formed by the polygons shown in FIG. 1B, but without a showing of the test cells and data values, so as to provide a better view of the approximating surface corresponding to the data elements shown in FIG. 1A and to more closely approximate the image as displayed on a viewing device.

In order to determine the degree of penetration of a particular surface into a test cell a comparison is first made between a preselected threshold value and each of the analog values at the vertices of a given test cell. If a vertex value is equal to or greater than the threshold, a binary "1" is assigned to that vertex; if less than the threshold, a "0" is assigned. In this manner a plurality of eight bit binary codes are developed, one for each cell, the codes indicating the impingement of a preselected surface into the test volumes. For example, with respect to test cube 100 of FIG. 1A, the vertices 24–27, and 13–15 correspond to "1" values (as indicated by the black dots) whereas the vertex 16 corresponds to a "0" as indicated by the dotted line). Thus, a code with one "0" and seven "1"s is assigned to cell 100. This code is then converted, according to the teachings of the aforementioned patents, into a preselected polygon or polygons which serve to approximate the intersection of the surface or body being displayed and the test cell 100. The representative polygon(s) for test cell 100 and all of the other test cells in FIG. 1A are shown in FIG. 1B along with the cubic test volumes. The representative polygons are shown alone in FIG. 1C in the manner in which they would be displayed on a viewing or display surface. The above description is intended only to summarize the disclosure of the aforementioned patents and a more detailed review of these applications should be made for further information. Additional information such as surface normal information is also generated and associated with the polygons in the manner described in the aforementioned applications, such additional information being needed to shade the displayed images. As can be seen from FIG. 1C the object represented by the 3-D array of values illustrated in FIG. 1A is converted to a 3-D display of the type shown in FIG. 1C. To briefly summarize, therefore, the basic process of the invention involves building up a 3-D image of an object by (1) generating a plurality of volumetric test cells defined by analog values which are a function of a preselected physical characteristic of the object at regularly spaced grid locations within the object to be displayed, the grid locations being defined in a conventional manner with respect to three mutually perpendicular axes;

(2) sequentially examining the analog values at the vertices of these test cells to generate binary codes which both select a particular portion of the object to be displayed (based on a preselected threshold) and its impingement into the test cells; and (3) generating for each test cell none, one or a set of polygonal representation surfaces which approximate the object corresponding to each cell, which polygons are then sequentially displayed based on a user defined viewplane or angle of viewing to cumulatively form the 3-D object or body.

With this as background, the novel method of the invention for scanning and displaying object information associated with the test cells may now be explained. As mentioned earlier, the primary object is to provide an order of scanning and display which inherently removes hidden surfaces without using the complex arrangement of the prior art noted above.

The projection technique used in accordance with the invention to display the three dimensional object on a two dimensional viewplane is referred to as orthographic parallel projection and is described in the aforementioned Foley and Van Dam text at pp. 270–274. According to that method the object to be imaged is formed on a selected viewplane by viewlines or projectors which are parallel to each other and normal with respect to the selected viewplane or projection plane. The techniques for translating and rotating the originally generated and stored image in order to properly display it as it appears when viewed along different viewlines are well known and described in great detail in the aforementioned Foley and Van Dam text.

The key observation on which the method of the invention is based is that the interior of all polygonal surfaces generated for a particular test cell by the above noted triangulation method are completely within the volume of the associated cell, as illustrated in FIG. 1B. Only vertices or edges may be held in common with triangles from other cells. Therefore, if a first cell contains no portion which is obscured by a second cell, then no triangle within the first cell will be obscured by any triangle within the second cell. A simple ordering will be demonstrated for scanning the cells so that each new cell displayed is completely unobscured by any previously displayed cell. Therefore, if the cells are scanned in this order and the polygons within each cell are sequentially projected and drawn onto the view surface, no polygon will be obscured by any previously-drawn polygon (except possibly for polygons within the same cell in which case the amount of observing will be minimal). A value written into a pixel can simply overwrite the previous value with no necessity for distance registers or comparisons. Since the polygons which cover a pixel are drawn in order from back to front, more complicated drawing procedures can be used, such as simulating translucency by mixing the old and new values to generate the result value at a pixel. No sort step is required, because this order guarantees that values will be written into any pixel from most distant surface to nearest suface (although the polygons themselves are not necessarily scanned in order of distance from the viewpoint). In fact, the scan ordering does not depend on the parameters of the polygons, but only on the location of the viewpoint with respect to the major axes of the grid.

The technique for scanning and displaying image information contained in the composite test cell structure disclosed in the aforementioned application will now be explained by reference to the wall of bricks (cells) illustrated in FIG. 2A. For purpose of explanation, the viewplane for the object in FIG. 2A will be assumed to be in the plane of the paper on which FIG. 2 appears. The order of scan will be described with reference to this viewplane: other viewplanes will yield variations on the described scan sequence which are obvious by analogy. We will assume an orthographic projection as previously alluded to, so each brick has the same angle and relations to its neighbors. For purposes of explaining the scanning sequence, the wall of bricks (cells) will be broken into a plurality of planar arrays 50, 60, 70 and 80, each array being parallel to the XY plane shown in FIG. 2A and perpendicular to the Z axis. Each array will be considered as containing three rows of cells, each row being at a different Y cordinate; each row consisting of a plurality of cells at different positions along the X axis.

Observe that no brick in any given XY-plane can obscure any brick in any XY-plane which is closer to the viewplane. Furthermore, within any plane or array, no brick in any y-row can obscure any brick in any y-row which is closer to the viewplane. Additionally, within any row, no brick can obscure any brick which is closer to the viewplane. The planar arrays 50, 60, 70 and 80 are ordered with regard to distance from the viewplane by projecting the intersection point of the array center and the Z axis onto the line-of-sight or normal to the viewplane. In a similar manner, the rows are ordered by projecting the intersection point of the row center and the Y axis onto the line-of-sight. Cells are similarly ordered by projecting the intersection point of the cell center and the X axis onto the line-of-sight. With the above as background, the following scan order will ensure that no brick (cell) is obscured by any previously-scanned brick (cell):

For each volume, scan by planar arrays in order of decreasing distance from the viewplane;

For each planar array, scan by rows in order of decreasing distance from the viewplane.

For each row, scan by cells in order of decreasing distance from the viewplane.

For each cell, paint all the triangles (polygons) in it on the display.

Applying the above scanning technique to the cell arrangement shown in FIG. 2A results in a sequential display of the cells in the order illustrated in FIGS. 2B-2E. As seen in FIG. 2B, the planar array most distant from the viewplane is 50 which contains cells numbered 1-9. Within this planar array of cells 1-9 are three rows, a first row containing cells 1-3, a second containing cells 4-6, and a third containing cells 7-9. Of these, the row most distant from viewplane is the row containing bricks 1-3. Furthermore, of the bricks in the row containing bricks 1-3, brick 1 is farthest from the viewplane.

Assuming the above, the scanning order for the cells of FIG. 2A is shown in FIGS. 2B-2E as following sequentially from brick 1 to brick 21. Bricks 22-27 are not shown in the figures but are scanned in an analogous manner.

A data structure to perform the above scanning is as follows: There is an array of plane descriptors, an array of row descriptors, and an array of polygon descriptors. Each array is stored contiguously and can be scanned forward and backward. For each planar array, the plane descriptor gives the indexes of the first and last row in the row array for the given planar array. For each row, the row descriptor array gives the indexes of the first and last polygon in the polygon array for the given row. For each polygon, the polygon descriptor gives the indexes of its vertices in a point array. No entries are made for a row or a planar array which contains no polygons. Using this 3-level structure, each coordinate can be scanned sequentially in an increasing or decreasing direction. Because each segment is scanned contiguously, the task of staging data into a pipeline or paging data into a memory of limited size is simplified. In fact, succeeding rows or planes could be staged into memory while a given row or plane is being processed.

The above scan order does not specify how to scan the polygons within a cell. Further refinements to the scan order are possible to permit scanning of the polygons within a cell in an order defined by the view angle. These would complicate the scan order at the finest level. In practice, it is generally unnecessary to order the polygons within a cell, because in cases of surfaces with low curvature one polygon with a cell will not obscure any significant portion of another polygon in the same cell. The errors due to scanning the polygons within a cell in a fixed order, regardless of view angle, might be less than those due to the initial approximation caused by sampling the data. In any case, the complexity needed to order the polygons within a cell would be small and far less than the complexity needed to order all the polygons in the image.

Once the voxel array is generated, the values can be filtered to reduce noise and passed through the triangulation engine. This step would be repeated whenever threshold density values change. The result is a cell-ordered set of triangles with 3-level index, and a set of triangle vertex points with average normal vectors. In a simple system, the triangulation might be slow compared to the viewing operation, so the set of triangles would be repeatedly scanned by the bricklayer's engine to generate an ordered set of triangles for the shading engine to paint on the raster. In a highly-pipelined system, the triangulation engine could scan the voxel data in the above noted order and pass the triangles (in the correct scan order) directly to the shading engine for immediate processing, eliminating the intermediate storage of triangles. Note that the triangulation engine need hold no more than two planes of voxels at one time (actually one plane plus one cell), so that no large intermediate store is needed. Furthermore, a solid model sampling could even be generated in the correct order by a pipelined unit, so that no large storage unit would be needed anywhere. Such an architecture would make possible interactive or even real-time manipulation of sampled images or solid models.

Figure 3:
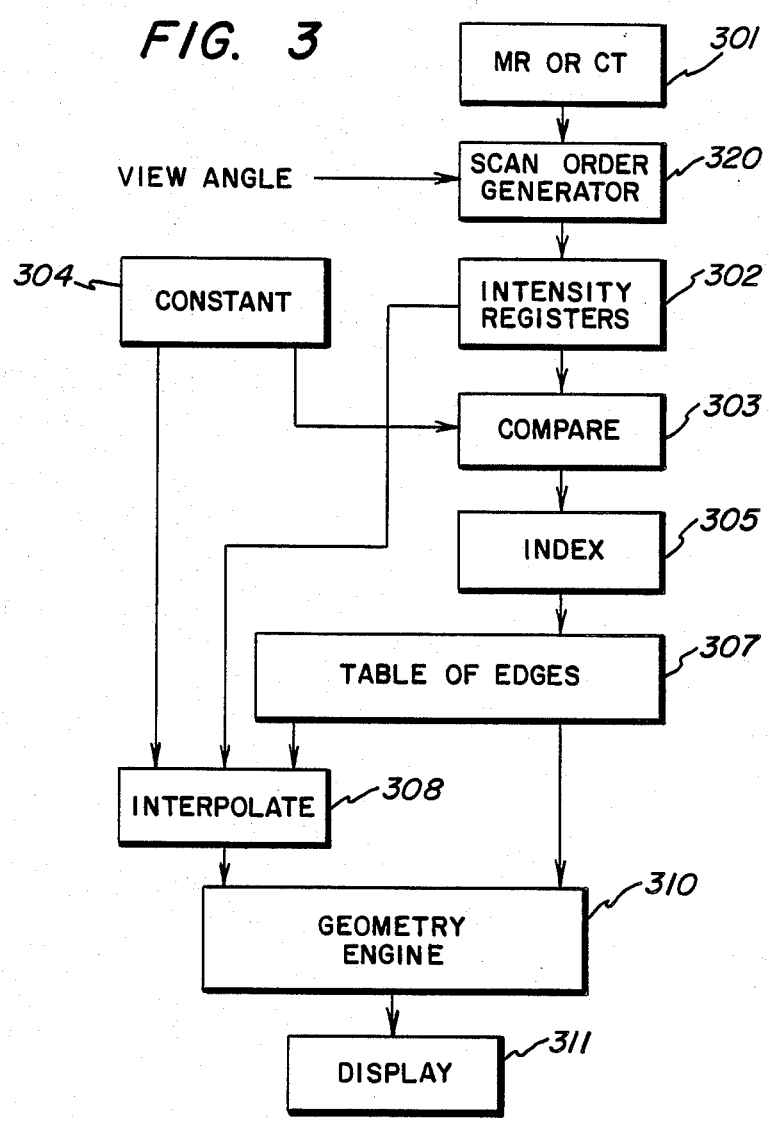
FIG. 3 is a schematic diagram illustrating the method and apparatus for implementing the present invention.

A data flow diagram for the present invention is shown in FIG. 3. In particular, data from magnetic resonance (MR) or computed tomography (CT) systems 301 is illustrated as being supplied to a scan order generator 320 which operates based on an input by a user of a viewangle, provided to calculate the order of cells as provided hereinbefore. The MR or CT data is then forwarded in the proper sequence to a set of intensity registers 302. Typically, the data is structured in the form of a plurality of layers of analog values as generally seen in FIG. 1A. In the present invention, only two adjacent layers are required at one time for data processing. Even more particularly, a single volumetric cell or voxel at a time is analyzed, each voxel cell comprising a set of "volumetrically adjacent" data points. If cubically shaped test cells as shown in FIG. 1A are employed, the eight cubically adjacent data values associated with each test cell are examined. It is noted though that the structure of the present invention readily permits the use of parallel processing systems.

The values in the intensity registers are compared at 303 with a predetermined constant 304 for each voxel element present in the scanning order described above. In general, the constant or threshold of comparison is the same for each voxel element. This comparison generates an eight bit vector which acts as an index at 305 to a table of edges 307. An abbreviated edge table is shown in the aforementioned applications. The other cases being merely obtained from the 15 cases by rotation or complementation. The data from the edge table is then used in conjunction with the data at the vertex points, as contained in the intensity registers to generate a set of points or vectors which are preferably interpolated at 308 in the manner described above. The threshold constant may also be employed in this interpolation. The interpolated data together with a list of table edges, is then supplied to a geometry engine 310, or display processor, which operates to generate either vector or raster format images in the scan order described above with reference to FIG. 2. In preferred embodiments of the present invention, the raster format is generated since this format provides better visual clues for three dimensional images. The resultant image is then typically displayed on a screen such as a cathode ray tube (CRT). As an alternative, instead of being calculated at 320, the scan order may be performed on the output of the interpolation and table of edges immediately prior to entry into the geometry engine.

Figure 4:
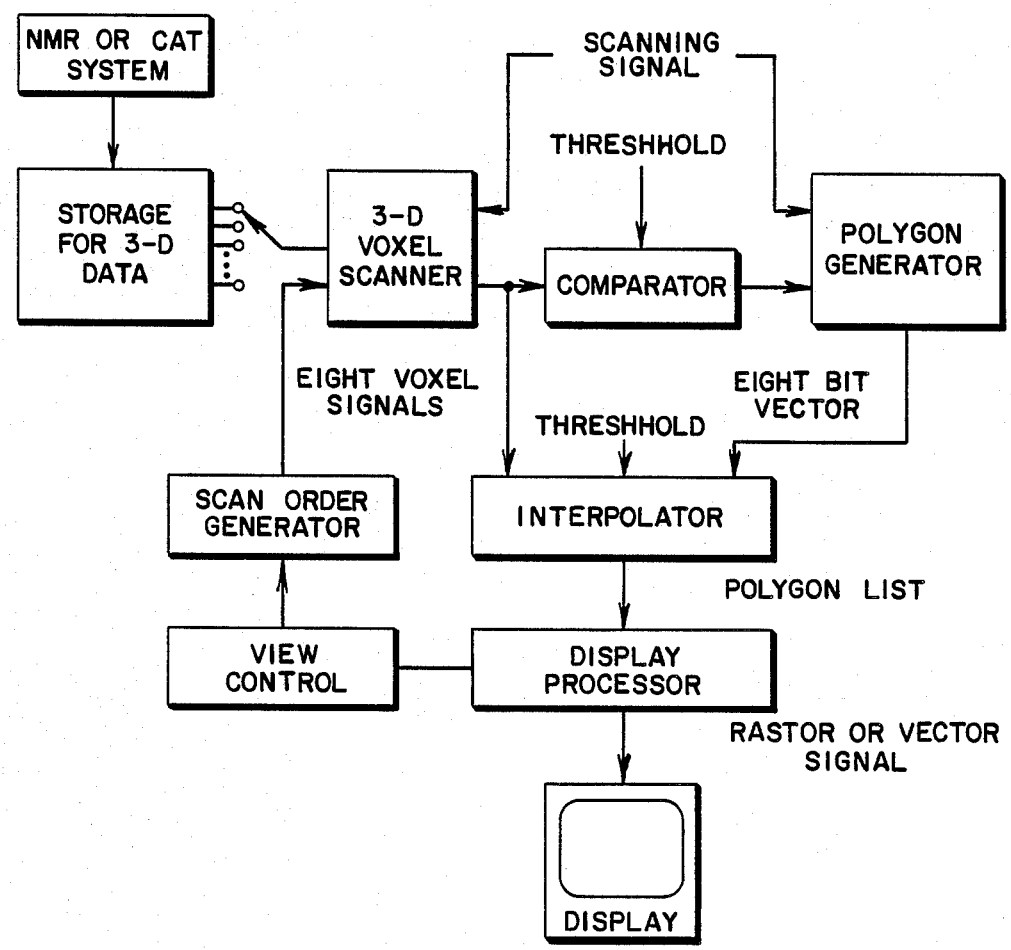
FIG. 4 is a functional block diagram more particularily illustrating functional components in a system constructed in accordance with the present invention.

FIG. 4 illustrates a system for imaging in accordance with the present invention. Three dimensional data is provided by a magnetic resonance or computed tomography system. As discussed above, other three dimensional data sources may also be employed. Typically, this information is supplied to a storage system for such three dimensional data. This system typically includes magnetic or other storage media. However, the data may be supplied directly to a sufficiently large random access device. It is noted, however, that it is only necessary to consider adjacent layers at any moment. In fact, it is only necessary to extract data from eight cubically adjacent data points at any moment. A voxel scanner driven by the scanning order generator of the present invention selects the particular set of eight data points for processing. The view angle is input to the scan order generator from the view control device, and is used to select the direction of scan of planes, rows and voxels, such that each is scanned starting with the most distant element and proceeding toward the viewplane. These eight data points are supplied to a comparator which is also supplied with a threshold value or range of values. The comparator generates an eight bit vector as described above. The eight bit vector is then supplied to a polygon generator. The polygon generator may comprise a read only memory incorporating the full version of the polygon table in the aforementioned application with 256 rows constructed as described above. A scanning signal is employed to synchronize the operation of the scanner and the generator. The scanner also supplies the set of eight voxel signals to an interpolator which is supplied with the threshold value and with the set of vectors from the polygon generator. As described above, an interpolation operation is performed to generate a polygonal surface approximation to the selected surface. The polygonal approximation is particularly adjusted for the proper normal direction by the interpolator. The scanning generation and interpolation operations are performed sequentially for each of the voxel elements in the data to generate a polygon list which is supplied to a display processor. Such display processors are readily available and are well known to those skilled in the computer aided drafting and design and computer aided manufacturing arts (CAD/CAM). In such devices, a viewing direction is typically selected. This view control is selectable by the operator. The display processor then generates a vector or raster format signal which is supplied to a CRT display device.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In an object displaying method for displaying a three dimensional object located within a volume being examined on a two dimensional viewplane including the steps of representing said volume by a plurality of volumetric cells defined by a set of data values at the vertices of said cells; generating different representative polygonal surfaces within said cells to represent said object based on said set of values, said polygonal surfaces being located within their associated cells, and sequentially displaying said polygonal surfaces to form a three dimensional image of said object, an improved polygonal surface displaying method for sequentially displaying said polygonal surfaces so that each surface displayed is unobscured by any previously displayed surface with respect to said selected viewplane comprising the steps of:

organizing, prior to said polygonal generating step, said cells to conjointly represent said volume by arranging them contiguous to each other and forming a plurality of parallel, planar arrays;

scanning said cells, prior to said polygon generating step, to provide said cells in a predetermined scan sequence for performance of said polygon surface generating step, said cells with their associated polygonal surfaces being displayed in the predetermined scan sequence such that the step of sequentially displaying said polygonal surfaces comprises the substeps of:

sequentially displaying said cells by planar arrays starting with the array most distant from said viewplane and proceeding to the array closest to said viewplane;

within each said displayed array, displaying said cells by rows starting with the row most distant from said viewplane and proceeding to the row closest to said viewplane;

within each said row, displaying said cells in order of decreasing distance from said viewplane; and for each cell, displaying the polygonal surfaces within said cell.

2. The method of claim 1 wherein said cells are parallel-epipeds.

3. The method of claim 1 wherein said cells are cubes.

4. The method of claim 1 wherein said data values represent at least one physical property associated with said object.

5. The method of claim 4 wherein said physical property is the x-ray absorption characteristic of said object.

6. The combination recited in claim 1 wherein said polygonal surfaces are triangles.

* * * * *